W. H. SMITH.
Valve-Coupling for Vacuum-Pipes.
No. 200,944. Patented March 5, 1878.
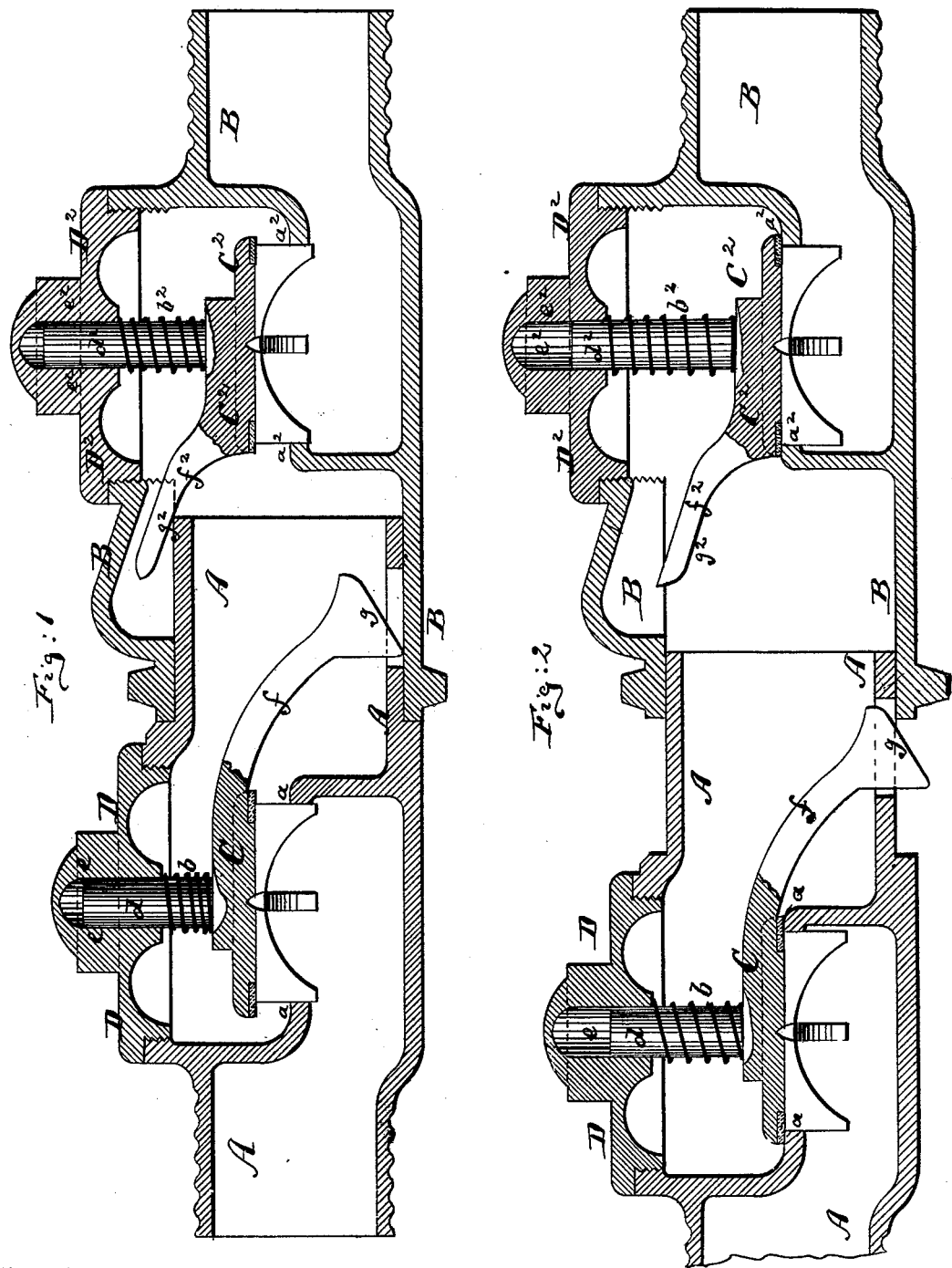
Witnesses:
John C. Tunbridge
T. R. Mosher
Inventor:
Wm. H. Smith
by his attorney
A. v. Briesen

UNITED STATES PATENT OFFICE.

WILLIAM H. SMITH, OF NEW YORK, N. Y., ASSIGNOR OF ONE-HALF HIS RIGHT TO WILLIAM EBBITT, OF SAME PLACE.

IMPROVEMENT IN VALVE-COUPLINGS FOR VACUUM-PIPES.

Specification forming part of Letters Patent No. 200,944, dated March 5, 1878; application filed February 7, 1878.

*To all whom it may concern:*

Be it known that I, WILLIAM H. SMITH, of New York city, county and State of New York, have invented a new and Improved Valve-Coupling for Vacuum-Pipes, of which the following is a specification:

Figure 1 is a longitudinal section of two joined sections of pipe having my improved valve-coupling. Fig. 2 is a similar section thereof, showing the pipes substantially separated.

Similar letters of reference indicate corresponding parts in both the figures.

This invention relates to a new arrangement of valves within the coupling ends of vacuum-pipes, such as are used on vacuum-brakes of railway-trains, and for other purposes.

The principal object of the invention is to have the valves close against their seats as soon as the pipes are uncoupled, and to hold them off the seats when the pipes are coupled.

The same object has been attained prior to my invention by other means, such as the application of pivoted levers to valves that move in the direction of the length of the pipe; but in said prior devices the valves were not accessible for inspection or repair, and were liable, owing to their position in the pipe, to drop off their seats if their springs had become weakened by wear.

My invention consists in using stiff projecting arms on the valves for raising them off their seats; also, in making the valves move radially within the pipes; and in other features of improvement hereinafter more fully described.

In the drawing, the letter A represents one section, and B the other section, of pipe, such as are used on the ends of rubber or other hose under railway-cars, said portions of pipe being properly secured to the hose, and constructed so that they may be readily coupled together. The manner of coupling does not constitute part of the present invention.

C is a valve fitted into the pipe A, and made radially movable therein, so that it can fit a seat, $a$, which is formed within said pipe, as shown in Fig. 2. A spring, $b$, which preferably embraces the stem $d$ of the valve C, presses said valve upon its seat. The stem $d$ enters a socket, $e$, which is formed in a screw-cap, D, that is screwed into an opening in the side of the pipe A, as shown.

By unscrewing the cap D, the valve is exposed for removal, repair, and replacement.

A rigid arm, $f$, projects from the valve C toward the outer end of the pipe A, and is provided with an inclined edge, $g$, which, when the valve C is closed, is in the way of the end of the pipe B, as in Fig. 2.

When the two pipes A and B are coupled together, the end of the pipe B, coming in contact with the inclined edge $g$ of the arm $f$, raises the valve C off its seat, so that thus the valve is opened when the pipes are coupled; but immediately upon uncoupling the pipes the spring $b$ will throw the valve upon its seat. Thus if part of a train should be wrecked, or if by any accident the cars of a train should become separated, the valve at the end of the last connected car will be closed, in manner stated, leaving the vacuum-brake mechanism properly operative.

The other pipe, B, has a similar valve, $C^2$, working radially to fit its seat $a^2$, against which it is pressed by the spring $b^2$, the stem $d^2$ of said valve entering a socket, $e^2$, of the screw-cap $D^2$. The valve has a rigid arm, $f^2$, whose inclined edge $g^2$ is in the way of the pipe B when the pipes are coupled, as in Fig. 1, so that in that case the valve will be raised off its seat.

Should either spring become weak, the valve will reach the seat by its own weight, provided the pipes are uncoupled. By the rigid arms $f f^2$ all pivots are dispensed with, and all wear and strain on said pivots, that often rendered the valves formerly in use inoperative.

I am aware that pivoted levers have already been used for opening valves that move in the direction of the length of the pipe. This is objectionable, as the pivots constantly strain the pipes and levers while the valves are open, and also because the valves cannot possibly be reached for repair or inspection without entirely disconnecting the hose from the pipe. By the rigidly-projecting arms I am enabled to move the valves laterally—*i. e.*, at right angles to the longitudinal axes of the pipes—to avoid all strain on any of the parts while the valves are open, and to reach the valves for repair, &c., by merely opening the caps in the sides of the pipes. Such caps would not be available for the longitudinal moving valves.

I claim as my invention and desire to secure by Letters Patent—

1. The combination of the pipe A with the laterally-movable valve C, having a rigid projecting arm, $f$, which projects in the way of the pipe to be coupled to the pipe A, and serves to open the valve when the pipes are coupled, without thereby straining any part of the pipe or mechanism, substantially as herein shown and described.

2. The pipe A, having screw-cap D, and combined with the laterally-movable valve C, having rigidly-projecting arm $f$, substantially as herein shown and described.

3. A coupling for the pipes of vacuum-brakes, consisting of pipes A B, having valves C $C^2$ in the same, said valves being moved laterally, and forced away from their seats by rigidly-projecting arms $f f^2$, all arranged substantially as herein shown and described.

W. H. SMITH.

Witnesses:
T. B. MOSHER,
A. V. BRIESEN.